United States Patent
Alarawi et al.

(10) Patent No.: US 12,449,395 B2
(45) Date of Patent: Oct. 21, 2025

(54) SYSTEM AND METHOD FOR REAL-TIME DRILLING FLUIDS PH MEASURING UTILIZING ELECTROLYTE INSULATOR SEMICONDUCTOR FIELD-EFFECT SENSORS

(71) Applicant: Saudi Arabian Oil Company, Dhahran (SA)

(72) Inventors: Abeer Ateeq Alarawi, Al Khobar (SA); Rami Adel Sindi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 687 days.

(21) Appl. No.: 17/654,743

(22) Filed: Mar. 14, 2022

(65) Prior Publication Data

US 2023/0288371 A1   Sep. 14, 2023

(51) Int. Cl.
*G01N 27/416* (2006.01)
*E21B 47/00* (2012.01)
(Continued)

(52) U.S. Cl.
CPC ......... *G01N 27/4167* (2013.01); *E21B 47/00* (2013.01); *G01N 27/286* (2013.01); *G01N 27/414* (2013.01); *G01N 33/2823* (2013.01)

(58) Field of Classification Search
CPC ............. G01N 27/4167; G01N 27/286; G01N 27/414; G01N 33/2823; E21B 47/00
See application file for complete search history.

(56) References Cited

U.S. PATENT DOCUMENTS 6,176,323 B1   1/2001   Weirich et al.
8,506,779 B2   8/2013   Kahn et al.
(Continued)

FOREIGN PATENT DOCUMENTS

CN   102338767 A   2/2012
DE   10062044 A1   6/2002
(Continued)

OTHER PUBLICATIONS

Kühne et al., pH-sensor under consideration for multi-sensor-chip in downhole drilling fluid monitoring, Proc. Of the ASME 2017 36th Int. Conf. on Ocean, Offshore and Arctic Engineering, Jun. 25-30, 2017 (Year: 2017).*

(Continued)

*Primary Examiner* — Luan V Van
*Assistant Examiner* — Shizhi Qian
(74) *Attorney, Agent, or Firm* — Leason Ellis LLP (57) ABSTRACT

Systems and methods for measuring pH of a drilling fluid in a downhole drilling environment are disclosed. The system includes wireless pH sensing devices dispersed in the drilling fluid and circulated through a borehole. The wireless pH sensing devices include a capsule shell for protecting internal electronics from harsh downhole conditions. The electronics include an electrolyte insulator semiconductor field-effect (EIS) pH sensor structure, a controller, RF communications unit and power supply. The pH sensing devices periodically measure the pH of the fluid while circulating through the borehole. Upon return of the sensors above ground, the pH measurements are wirelessly provided to a monitoring computer, prior to recirculating the sensors through the borehole.

7 Claims, 8 Drawing Sheets

(51) Int. Cl.
  *G01N 27/28* (2006.01)
  *G01N 27/414* (2006.01)
  *G01N 33/28* (2006.01)

(56) References Cited

U.S. PATENT DOCUMENTS

| | | | |
|---|---|---|---|
| 9,201,039 | B2 | 12/2015 | Hanko |
| 9,267,913 | B2 | 2/2016 | Shintani et al. |
| 10,132,699 | B1 * | 11/2018 | Pillars .................. G01L 1/106 |
| 10,538,800 | B2 | 1/2020 | Takechi et al. |
| 10,739,305 | B1 | 8/2020 | Bhansali et al. |
| 2007/0193351 | A1 * | 8/2007 | DiFoggio ............... E21B 47/10 436/27 |
| 2008/0063566 | A1 | 3/2008 | Matsumoto et al. |
| 2008/0134759 | A1 | 6/2008 | Mohammed-Abrahim et al. |
| 2009/0273356 | A1 | 11/2009 | Pampin et al. |
| 2010/0045309 | A1 * | 2/2010 | Zou ...................... A61B 5/073 324/663 |
| 2011/0100810 | A1 | 5/2011 | Merz |
| 2015/0176402 | A1 * | 6/2015 | Prakash ............... E21B 49/005 73/152.19 |
| 2018/0031517 | A1 | 2/2018 | Netzer et al. |
| 2019/0249548 | A1 * | 8/2019 | Zhang ................... H04L 67/12 |
| 2020/0149396 | A1 * | 5/2020 | Rodney ................ E21B 47/10 |
| 2021/0181143 | A1 | 6/2021 | Solomon et al. |

FOREIGN PATENT DOCUMENTS

| | | |
|---|---|---|
| DE | 102010062224 A1 | 5/2012 |
| WO | 2019244113 A1 | 12/2019 |
| WO | 2021028913 A1 | 2/2021 |

OTHER PUBLICATIONS

Kuo et al., A precise pH microsensor using RF-sputtering IrO2 and Ta2O5 films on Pt-electrode, Sensors and Actuators B: Chemical, 2014, 193, 687-691 (Year: 2014).*

Ruan et al., A wireless pH sensor based on the use of salt-independent micro-scale polymer spheres, Sensors and actuators B, 2003, 96, 61-69 (Year: 2003).*

Yoshida et al., Development of a wide range pH sensor based on electrolyte-insulator-semiconductor structure with corrosion-resistance Al2O3—Ta2O5 and Al2O3—ZrO2 double-oxide thin films, Journal of the electrochemical society, 2004, 151(3), H53-H58 (Year: 2004).*

Manjakkal, L., et al; 2020. Metal Oxides Based Electrochemical pH Sensors: Current Progress and Future Perspectives. Progress in Materials Science, 109, p. 100635.

Hui Li et al; Chemical and Biomolecule Sensing with Organic Field-Effect Transistors; Department of Materials Science and Engineering, John Hopkins University, Maryland; Chemical Reviews, 119(1), pp. 3-35.

Raghuraman, B. et al, 2007. Real-Time Downhole pH Measurement Using Optical Spectroscopy. SPE Reservoir Evaluation & Engineering, 10(03), pp. 302-311.

Jonathan Kuhne, et al; PH-Sensor Under Consideration for Multi-Sensor-Chip in Dwonhole Drilling Fluid Monitoring; Proceedings of the ASME 2017 36th International Conference on Ocean, Offshore and Arctic Engineeting; Jun. 25-30, Trondheim, Norway; 9 pages.

Jesus A. Canas, et al; New Downhole Fluid Analysis (DFA) Technologies Supporting Improved Reservoir Management; Society of Peroleum Engineers; ResearchGate; https://www.researchgate.net/publication/254526914; 10 pages.

* cited by examiner

SYSTEM AND METHOD FOR REAL-TIME DRILLING FLUIDS PH MEASURING UTILIZING ELECTROLYTE INSULATOR SEMICONDUCTOR FIELD-EFFECT SENSORS

FIELD OF THE DISCLOSURE

The present invention relates to oil and gas well drilling monitoring systems and, in particular, pH sensor systems for monitoring pH of a water-based mud drilling fluid in downhole drilling environments.

BACKGROUND OF THE DISCLOSURE

Logging-, surveying- and drilling-dynamics sensor tools are used in nearly all the onshore and offshore oil and gas wells.

pH, which historically denotes "potential of hydrogen," is a scale used to specify the acidity or basicity of an aqueous solution. Acidic solutions (solutions with higher concentrations of H+ ions) are measured to have lower pH values than basic or alkaline solutions. Drilling fluid pH has a significant influence on the properties of drilling fluids (e.g., water-based muds) used in the drilling of subterranean wells. Currently, drilling fluid properties are still monitored at the surface and their behavior under borehole conditions is predicted with hydraulic models. Drilling fluids behave differently under bore-hole conditions dependent on temperature, pressure, and composition. The pH of the drilling fluids will be decreased if there is any acid gases mixed with the fluid, and then will have a negative impact on the mud properties like the rheology of the mud (PV, YP, Gel Strengths, Viscosity), and the mud will not be able to perform the required functions from it. In water-based muds (WBM), pH is a crucial parameter for suspension, additive stability, and to reduce corrosion. Controlling pH is also important to avoid bacterial growth and clay swelling in boreholes. Most of the polymers used in drilling work best in an alkaline environment. Moreover, the pH is an indicator for changing bore-hole conditions related to acidic gas and liquid influxes or formation changes. For example, gases will expand and escape from the solution during pressure reduction, while salts will dissolve or precipitate due to temperature changes, thus altering the drilling fluid properties. Corrective action has to be taken quickly when it comes to certain scenarios associated with the drilling fluid, e.g. influxes or kicks. The early detection of such scenarios is crucial in any drilling operation since it touches all sensitive areas of HSE (Health, Safety and Environment).

It is with respect to these and other considerations that the disclosure made herein is presented.

SUMMARY OF THE DISCLOSURE

According to an aspect of the present disclosure, a system for measuring pH of a water-based mud (WBM) drilling fluid in real-time in a downhole drilling environment is disclosed. The system comprises a wireless pH sensing device configured to be deposited in the WBM and for measuring a pH of the WBM. In particular, the wireless pH sensing device includes a capsule shell and a pH sensor of a type having an electrolyte insulator semiconductor field-effect (EIS) structure. The wireless pH sensing device also includes a controller operatively connected to the pH sensor and configured to measure the pH of the WBM using the EIS pH sensor. Additionally, wireless pH sensing device includes a radio-frequency (RF) communications unit operatively connected to the controller and configured to wirelessly transmit the measured pH to a remote monitoring computer. Furthermore the wireless pH sensing device includes an energy unit for powering the controller, RF communications unit and pH sensor. Additionally, the controller, RF communications unit, pH sensor and energy unit are encapsulated within the shell, and the shell is made of a material that resists degradation from chemicals, temperatures and pressures of the downhole drilling environment.

According to a further aspect of the present disclosure, a system for measuring pH of a WBM drilling fluid in real-time in a downhole drilling environment is provided. The system comprises a plurality of wireless pH sensing devices configured to be dispersed in the WBM and for measuring a pH of the WBM during circulation of the WBM through the downhole drilling environment.

In particular, each of the wireless pH sensing devices includes a capsule shell that encapsulates a controller, an RF communications unit, a pH sensor and an energy unit. Additionally the capsule shell is made of a material that resists degradation from chemicals, temperatures and pressures of the downhole drilling environment.

The pH sensor is of a type having an EIS structure. More specifically, the EIS pH sensor comprises a semiconductor material substrate, a gate insulator material layer disposed over a first surface of the semiconductor substrate, such that an outer surface of the insulator layer is exposed through the capsule shell and thereby is in contact with the WBM during use and separates the WBM from the semiconductor substrate. The EIS pH sensor also includes a rear-side electrical contact provided at a second surface of the semiconductor substrate that is opposite to the first surface of the semiconductor substrate. Additionally, a reference electrode is exposed to the WBM through the capsule shell.

The controller of the wireless pH sensing devices is operatively connected to the pH sensor. During circulation of the wireless pH sensing device through the downhole environment, the controller is configured to apply a gate voltage between the reference electrode and the rear-side contact and an alternating voltage, and periodically measure one or more electrical parameters representing the pH of the WBM, thereby capturing a respective pH measurement at plurality of locations within the downhole drilling environment.

The RF communications unit of the wireless pH sensing device is operatively connected to the controller and configured to wirelessly transmit the measured pH to a remote monitoring computer. Additionally, the energy unit is configured for powering the controller, RF communications unit and pH sensor.

The system further comprises a monitoring computer provided above ground. The monitoring computer is configured to wirelessly receive the respective pH measurements captured by the wireless pH sensing devices upon the wireless pH sensing devices returning above ground.

According to a further aspect of the disclosure, a method for measuring pH of a water-based mud (WBM) drilling fluid in real-time in a downhole drilling environment is disclosed. The method includes the step of dispersing a plurality of wireless pH sensing devices within the WBM for circulation through the downhole drilling environment along with the WBM. In particular, the plurality of wireless pH sensing devices each include a capsule shell made of a material that resists degradation from chemicals, temperatures and pressures of the downhole drilling environment. Encapsulated within the shell is an EIS-type pH sensor, a controller, an RF communications unit and an energy unit for powering the controller, RF communications unit and pH sensor. The controller is operatively connected to the pH sensor and configured to periodically measure the pH of the WBM during circulation of the wireless pH sensing device through the downhole environment. The RF communications unit is operatively connected to the controller and configured to wirelessly transmit the measured pH to a monitoring computer located above ground.

The method further comprises the step of, during circulation of a given wireless pH sensing device among the wireless pH sensing devices through the downhole drilling environment, measuring by the given wireless pH sensing device a respective pH value for a plurality of locations within the downhole drilling environment. Additionally, the method includes, upon return of the given wireless pH sensing device above ground from the downhole drilling environment, wirelessly receiving, by a monitoring computing provided above ground, the respective pH values measured by the given wireless pH sensing device.

These and other aspects, features, and advantages can be appreciated from the accompanying description of certain embodiments of the invention and the accompanying drawing figures and claims.

DESCRIPTION OF CERTAIN EMBODIMENTS OF THE DISCLOSURE

By way of overview and introduction, the systems and methods disclosed herein concern a system for monitoring drilling fluid pH in a downhole drilling environments. More specifically, the systems and methods disclosed herein concern pH measuring system using electrolyte insulator semiconductor field-effect (EIS) structures that are specifically configured for use in downhole drilling environments.

A drilling assembly utilized to drill hydrocarbon wells consists of hollow steel drill pipes with a drill bit at the bottom. The drill bit is a cutting tool that rotates and penetrates through rock formations below the surface to reach a hydrocarbon reservoir thousands of feet below the ground safely and quickly as possible. Three drill pipes connected together, say, 90 feet in length (referred to as "a stand"), are rotated and lowered into the wellbore to penetrate into the rock formations. This process is repeated until the target well depth is reached. During drilling, drilling fluid, such as water-based mud, is circulated between the drill string and the surrounding borehole or borehole casing to facilitate drilling.

Drilling fluids behave differently under bore-hole conditions dependent on temperature, pressure, and composition. The pH of the drilling fluids will be decreased if there is any acid gases mixed with the fluid, and then will have a negative impact on the mud properties like the rheology of the mud (PV, YP, Gel Strengths, Viscosity), and the mud will not be able to perform the required functions from it. In water-based muds (WBM), pH is a crucial parameter for suspension, additive stability, and reduce the corrosion. Controlling pH is also important to avoid bacterial growth and clay swelling in boreholes. Most of the polymers work best in an alkaline environment. Moreover, the pH is an indicator for changing bore-hole conditions related to acidic gas and liquid influxes or formation changes. For example, gases will expand and escape from the solution during pressure reduction, while salts will dissolve or precipitate due to temperature changes, thus altering the drilling fluid properties. Corrective action has to be taken quickly when it comes to certain scenarios associated with the drilling fluid, e.g. influxes or kicks. The early detection of such scenarios is crucial in any drilling operation since it touches all sensitive areas of HSE (Health, Safety and Environment).

Currently, drilling fluid properties are still monitored at the surface and their behavior under borehole conditions is predicted with hydraulic models. This approach leads to inaccurate results and thus sub-optimal control over drilling fluid properties. Commercial pH-sensing devices, such as the glass electrode, and optical sensors are not appropriate for the pH measurement under bottom-hole conditions. The insufficient degree of miniaturization, the low temperature and pressure resistance due to the liquid reference electrolyte, and phenomena such as the alkaline error are certain disadvantages of glass electrodes. Moreover, optical sensors cannot detect the whole pH scale and require the medium to be at least slightly transparent for light.

To address these and other considerations, embodiments of the disclosure concern a pH sensor which has an electrolyte insulator semiconductor field-effect (EIS) structure specifically configured for use in the harsh downhole process environment as a "measuring-while-drilling" pH sensor. EIS field-effect sensors belong to a new generation of electronic chips for pH sensing, enabling a direct electronic readout with small size, less weight, fast response time, label-free operation, and possibility of real-time and multiplexed measurements. Also, EIS sensors are compatible with micro and nanofabrication technologies with the future prospect of a large-scale production at relatively low cost. Embodiments of the EIS sensors structure are comprised of rugged materials that can survive at down-hole conditions and that are very sensitive to pH changes. EIS sensors constructed in accordance with one or more of the disclosed embodiments provide at least the following advantages: the ability to be used at harsh environment (e.g., can survive under the effect of aggressive chemicals, in combination with high temperatures and pressures); present low risk, even when the sensors are contacting with flammable and pressurized hydrocarbons, in the down-hole zones; the data obtained by these sensors can be used to enhance safety by providing information about the drilling fluids conditions in the well. As such, embodiments of the EIS-based pH sensor systems are well suited for down-hole applications, provide highly accurate measurements with a high level of reliability and ultimately can help improve drilling fluid performance while minimizing safety incidents.

Embodiments of the disclosure are further directed to a real-time drilling fluids pH measuring system utilizing a plurality of the EIS pH sensor devices, which are deposited into the drilling fluid (e.g., drilling mud) and circulated through the borehole to capture pH measurements all along the drill string. By dispersing the sensor devices in the drilling fluid and circulating the fluid through the borehole, the pH sensors capture measurements throughout the borehole as a distributed system. Upon return of the pH sensors to the surface, respective EIS pH sensor measurements are downloaded and analyzed by a monitoring computer that is further configured to generate a real-time profile of the pH within the wellbore during the drilling process. The monitoring computer can be further configured to adaptively control one or more drilling-related processes based on the generated profile, such as adjust the composition of the drilling fluid. Although referred to as a real-time monitoring system, it should be understood that the pH sensor measurements can be captured and monitored in near real-time without departing from the scope of the disclosed embodiments.

The Exemplary EIS Sensor

Figure 1A:
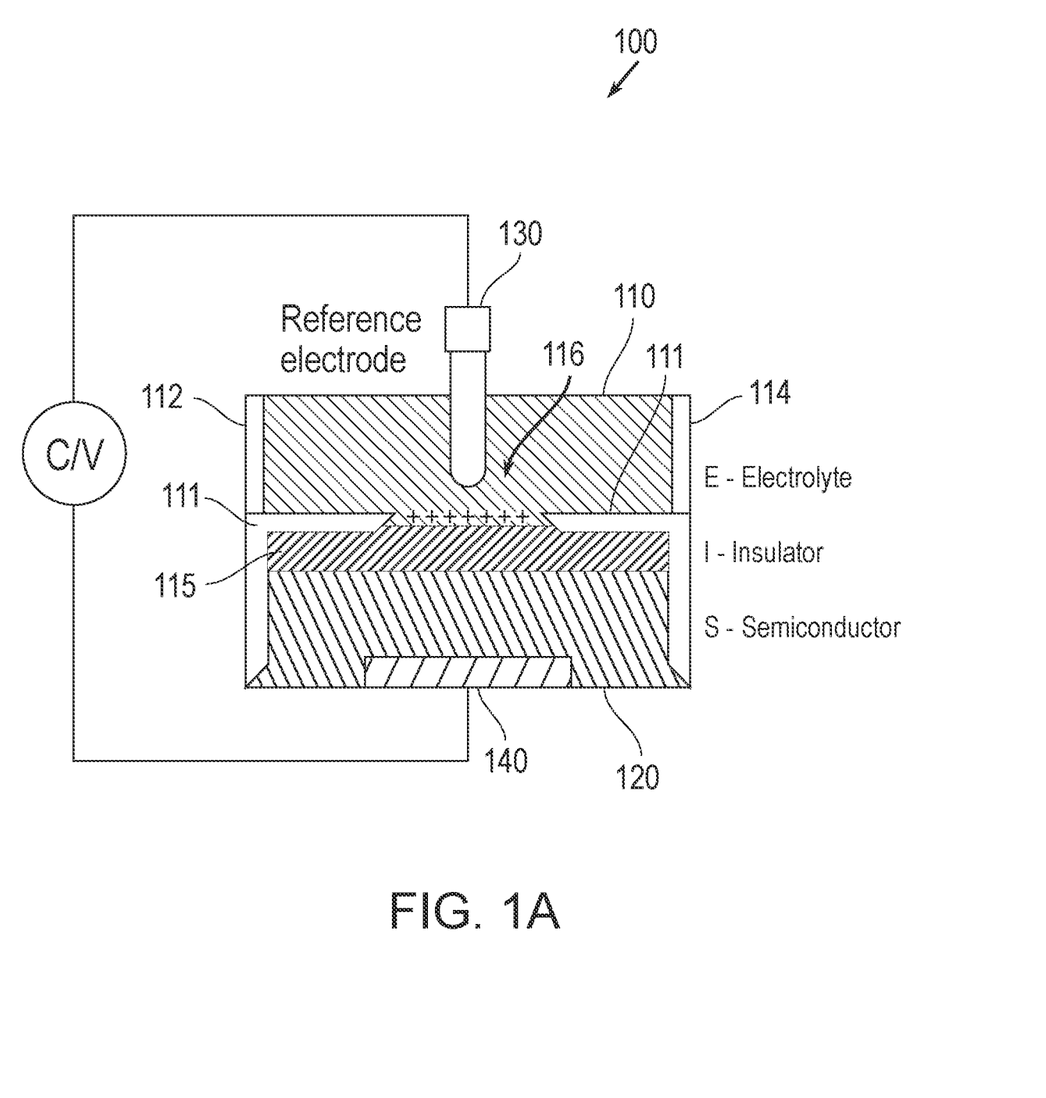
FIG. 1A is a schematic diagram of an example pH sensor having an electrolyte insulator semiconductor field-effect sensor (EIS) structure, according to an embodiment.

FIG. 1A is a diagram of an exemplary pH sensor having an EIS structure according to an embodiment. The EIS sensor comprises a semiconductor substrate 120 (either an n-type or p-type silicon) that is covered on one surface by a gate insulator material layer 115 (or "sensing layer") and having a rear-side electrical contact layer 140 provided on the side of the semiconductor that is opposite the sensing layer.

In an embodiment, the EIS sensor can comprise one or more walls including sidewalls 112 and 114 and bottom wall(s) 111 that define a cup like structure having an open top end and configured to be filled with the electrolyte 116, namely, the water-based mud (WBM), during use.

In an embodiment, the sensing layer 115 can be made of a thin material layer (e.g., 10-100 nm thick), or a stack of layers. The sensing layer can be, for instance, a metal oxide material. At least a portion of an outer surface of the sensing layer 115 is arranged to be in direct contact with the electrolyte 110. For instance, in the configuration shown in FIG. 1A, the outer surface of the sensing layer can be exposed to the electrolyte of the sensing layer through an opening defined in the bottom wall 111 of the cup. The sensing layer is arranged to separate the semiconductor from the electrolyte and prevents current passing through the insulator to the semiconductor during use.

In an embodiment, the rear-side contact layer 140 provided on the semiconductor substrate 120 can be made of Aluminum, for example. The reference electrode 130 provides the second electrode of the EIS sensor. The reference electrode 130 (RE) can comprise a conventional Ag/AgCl liquid-junction electrode, in an embodiment.

In an embodiment, the reference electrode is made from an ionic conducting ceramic in the EIS sensor, as such a material demonstrates good stability in either aqueous buffer solutions or harsh environments such as highly alkaline oil drilling WBMs. In addition, in an embodiment, the impedance of the reference electrode is smaller than 1 kW, which is desirable as it is compatible with the requirements of industrial sensors.

In an embodiment, the semiconductor layer 120 of the EIS sensor is made of Iridium oxide (IrOx) material. This oxide has several characteristics that positively impact the sensor performance, such as high sensitivity, good stability, and long lifetime in a wide range of pH, even in harsh conditions such as an oil and gas downhole drilling environment.

For the operation of EIS sensor 100, a gate voltage ($V_G$) is applied between the reference electrode 130 and the rear-side contact 140 to regulate the capacitance and set the working point of the sensor circuit. A relatively small alternating voltage, for instance, in the range of approximately 10-50 mV, is also applied to measure the capacitance of the structure. The gate insulator is assumed to be ideal that is, no current passes through the insulator.

More specifically, for example and without limitation, capacitance can be measured using the EIS sensor according to the principles described next. For the operation of EIS sensors, a gate voltage ($V_G$) is applied between the reference electrode and the rear-side contact to regulate the capacitance and set the working point; a small alternating voltage (~10-50 mV) is superimposed to measure the capacitance of the structure.

The electrical equivalent circuit of the EIS sensor is complex and involves components related to the semiconductor, gate insulator, electrolyte/insulator interface, bulk electrolyte, and reference electrode. However the equivalent circuit of an EIS sensor can be simplified as a series connection of the gate-insulator capacitance ($C_i$) and the variable semiconductor space-charge capacitance ($C_{sc}$ (VG, $\phi$)), which is, among others, a function of the gate voltage ($V_G$) and the electrolyte-insulator interfacial potential ($\phi$). Hence, the expression for the total capacitance (C) of the bare EIS sensor is given in Equation (1):

$$C = \frac{CiCSC(VG, \phi)}{Ci + CSC(VG, \phi)} = \frac{Ci}{1 + Ci/CSC(VG, \phi)} \quad (1)$$

Figure 6:
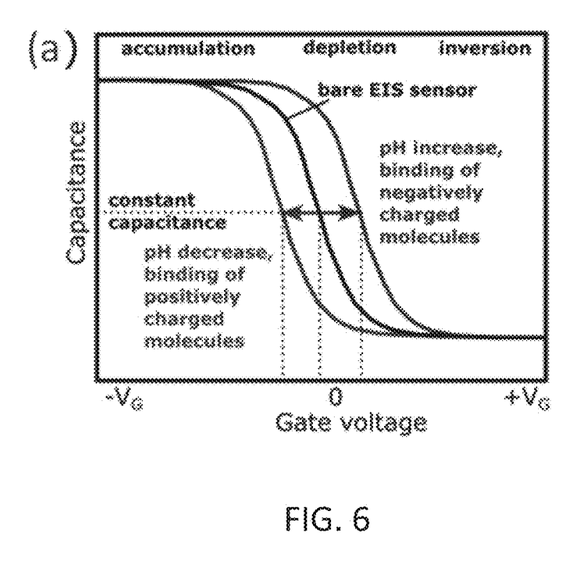
FIG. 6 is a chart showing exemplary frequency capacitance-voltage (C-V) response curves.

EIS sensors are basically characterized by either (C-V) and/or constant-capacitance mode. FIG. 6 is a chart showing a typical EIS shape of frequency capacitance-voltage (C-V) ConCap response curves. The typical shape of a frequency C-V curve for a p-type EIS sensor with characteristic regions of accumulation, depletion, and inversion is shown in FIG. 6 (middle curve). An n-type EIS sensor exhibits an identical C-V curve; however, the voltage polarity is reversed. If a negative potential ($V_G$<0) is applied to the gate, the positively charged holes (majority carriers) will be attracted and accumulated at the semiconductor/insulator interface. In accumulation regime, $C_i$<<$C_{sc}$ ($V_G$, $\phi$), i.e., the overall capacitance of the EIS structure is determined by the geometrical capacitance of the gate insulator, C=Ci, and, thus, corresponds to its maximum capacitance. When applying a small positive potential ($V_G$>0) to the gate, the holes will be pushed away from the interface semiconductor/insulator. As a result, a space-charge region is formed at the semiconductor/insulator interface, which is depleted of mobile carriers (so-called depletion region). The width of the depletion layer is determined by different parameters, such as the applied voltage, doping concentration within the semiconductor, dielectric constant, and insulator thickness. Increasing the amplitude of the applied gate voltage results in an increase of the width of the depletion layer and, consequently, to a decrease of the total capacitance. If the magnitude of the positive gate potential is sufficiently high, the Fermi level bends below the intrinsic level: the concentration of electrons near the semiconductor/insulator interface exceeds the hole concentration, i.e., a thin layer of n-type silicon (so-called inversion layer) is formed, although the substrate is a p-type. By strong inversion, the width of the depletion layer reaches its maximum, and the high-frequency total capacitance of the EIS structure approaches its minimum value.

Equation (1) describes the total capacitance of the EIS sensor without defining the origin of the potential generation at the interface electrolyte/insulator. When fixing the applied gate voltage ($V_G$) the only variable component is the interfacial potential ($\phi$) which is analogous to the effect of applying an additional voltage to the gate. Since EIS are potential-/charge-sensitive devices, any kind of chemical and/or electrical change at or nearby the interface electrolyte/gate can be detected. Those changes can be induced by chemical reactions, when the capacitive field-effect sensor is functionalized with a particular chemical recognition element, such as a pH-sensitive layer. For investigating charge e effects in such capacitive EIS structures, the shift of the C-V curves along the voltage axis ($\Delta V_G$) in the depletion region (FIG. 1a) is more important. The direction of these potential shifts depends on the charge sign of the adsorbed chemical species. For example, in case of a p-type EIS structure, an increase of the analyte's pH value or binding of the negatively charged species to the gate surface will decrease the width of the depletion layer, yielding an increase of the depletion capacitance in semiconductor/insulator interface. By this, the total capacitance of the sensor will increase, and the C-V curve will shift to the direction of more positive (or less negative) gate voltages (FIG. 6, right-side curve). Conversely, a pH decrease or the electrostatic adsorption or binding of positively charged species to the gate surface will lead to an increase of the width of the depletion layer; the space-charge capacitance will decrease. Consequently, the total capacitance of the EIS sensor will also decrease, resulting in a shift of the C-V curve towards more negative (or less positive) gate voltages (FIG. 6, left-side curve).

For a proper measurement, the reference electrode is configured to provide a stable potential independent of the pH value of the solution or concentration of the dissolved species. More specifically, the reference electrode is an electrode, which has a stable and well-known electrode potential, and it is used as a point of reference in the electrochemical cell for the potential control and measurement. For a correct functioning of field-effect EIS sensors, the reference electrode should provide a stable potential during measurements independent of the pH value of the solution or concentration of the dissolved species. This can be achieved by applying the liquid-junction reference electrode (e.g., Ag/AgCl electrode). In addition, the reference electrode is preferably pressure, and temperature-resistant.

Figure 1B:
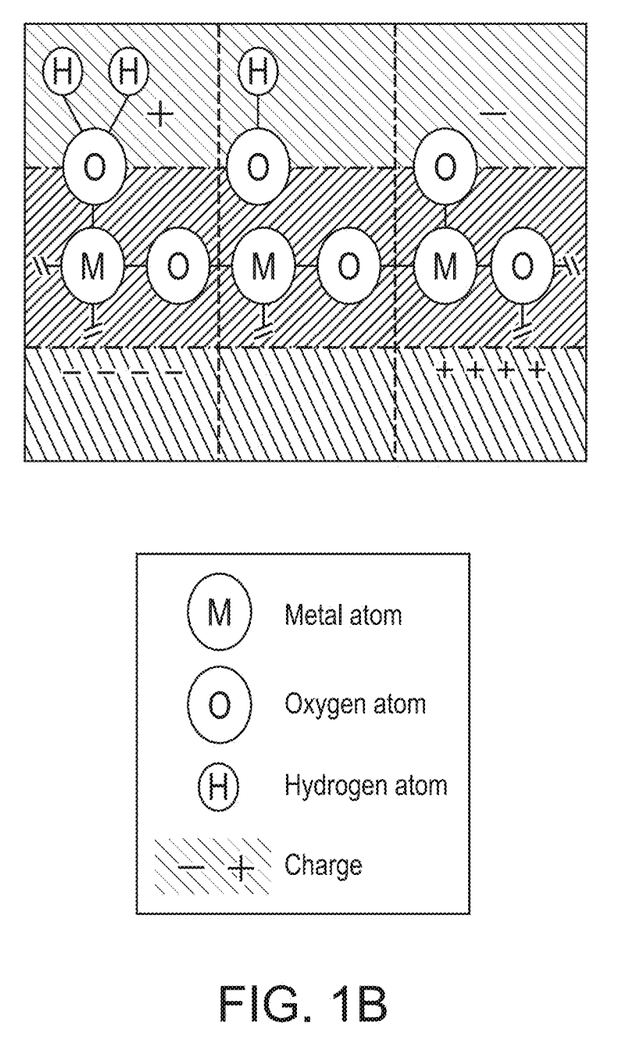
FIG. 1B is a schematic diagram of the example EIS pH sensor of FIG. 1A conceptually illustrating its mode of operation, according to an embodiment.

The EIS sensor's working mechanism relies in the appearance of hydroxyl groups at the surface of the sensing layer 115, which can be protonated or deprotonated depending on the hydrogen ions concentration and electrolyte pH value reform. FIG. 1B is a close-up view of the EIS-structure of FIG. 1A conceptually illustrating the protonation (left) and deprotonation (right) of surface sites with resulting charges as well as a neutral surface charge (middle). This variable surface charges lead to a change of the charge carrier distribution in the underlying semiconductor substrate. If the EIS structure is electrically contacted, as can be seen in FIG. 1, an EIS sensor detects potential (charges) change at the electrolyte/gate-insulator interface, resulting from the changes in the local or bulk pH. This change in charge carrier distribution can be measured by acquiring capacitance/voltage (C/V) curves, which show a shift along the voltage axis proportional to the surface charge and the pH value reform (pH range to be 7-12) of the electrolyte (i.e., the water-based mud). Based on the C/V curves, a pH of the electrolyte can be calculated, as explained above.

The EIS pH sensor provides various beneficial characteristics including improved sensitivity, selectivity, stability, a linear pH range, hysteresis, and response time. Other important properties include temperature stability, light insensitivity, reproducibility, and long-life-time.

Figure 2A:
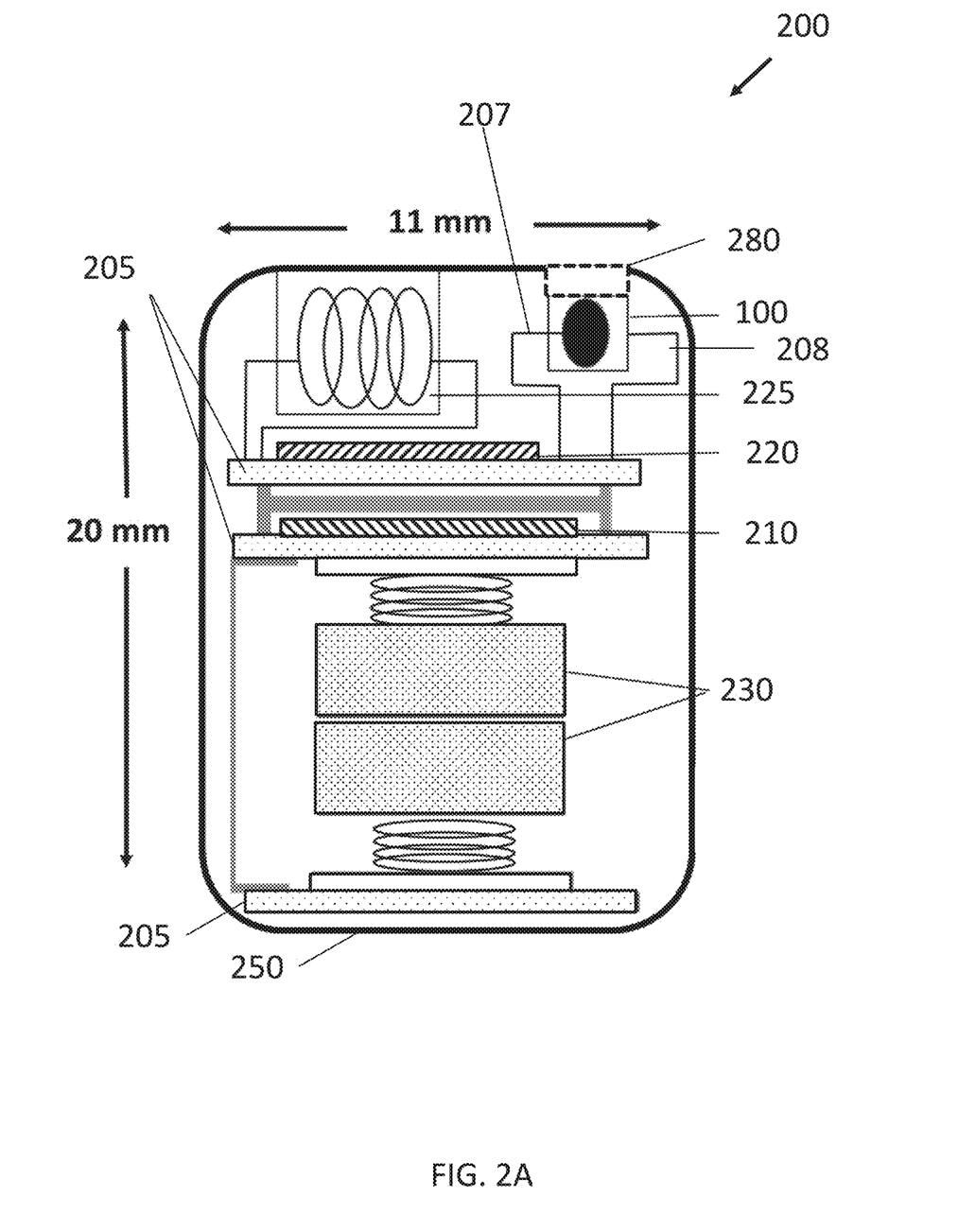
FIG. 2A is a side-view schematic diagram of an exemplary configuration of a wireless pH sensor device including an EIS pH sensor for measuring pH in a downhole environment, according to an embodiment.

FIG. 2A is a side-view schematic diagram illustrating an exemplary configuration of a wireless pH sensor device 200 (the "wireless pill") for measuring pH of a drilling fluid in a downhole environment, according to an embodiment. FIG. 2A shows the primary components of the wireless pill, which can include an exterior capsule shell 250 containing a circuit of interconnected electronic components including an EIS pH sensor unit (e.g., the EIS sensor 100), a radio-frequency (RF) communications unit, a controller 210 and an energy unit for powering the electronic components.

The controller 210 is configured to control operation of the wireless pill electronics. As shown, the controller is electrically connected to the EIS sensor 100, for instance, via one of the printed circuit boards 205 and electrical leads 207 and 208 that connect the controller to the reference electrode 130 and rear-side contact 140 (see FIG. 1A), respectively.

In operation, the controller is configured to receive and processes measurements indicative of pH that are captured using the EIS sensor 100. For instance, the controller can be configured to apply the gate voltage ($V_G$) between the reference electrode and the rear-side contact to regulate the capacitance and set the working point and apply the small alternating voltage (~10-50 mV) used to measure one or more electrical parameters that can be indicative of the drilling fluid pH. The measured electrical parameters representing a pH of the drilling fluid can include, for example and without limitation, one or more of a potential change at the interface between the drilling fluid and the gate insulator material layer, a capacitance of the structure, and capacitance/voltage (C/V) curves. Additionally, the controller can be configured to determine the pH of the electrolyte based on the acquired parameters, such as the C/V curves.

In some example embodiments, the controller 210 comprises a computing circuit (such as a microprocessor) configured by executing control logic in the form of computer code to be to perform the pH measuring and other control steps that are part of the technique. For ease of description, controller is used to reference such processing logic (e.g., ASIC, FPGA, processor, custom circuit, or the like) throughout. For further ease of description, the controller is programmable by code to perform the processing logic (or otherwise customize the circuit to perform its intended purpose).

Although not shown, the data collected by the controller can be stored in a non-transitory computer readable storage medium such as static random-access memory, where the data can remain as long as the wireless pill is powered, or a storage medium configured for more persistent data storage. The storage medium can be integrated on-chip with the controller 210 as random-access memory (RAM) or cache memory in microcontrollers, Application Specific Integrated Circuits (ASICS), Field Programmable Gate Arrays (FPGAs) and Complex programmable logic devices (CPLDs).

The wireless pill 200 further comprises a communications unit configured to wirelessly transmit data gathered by the controller 210 to remote devices and thus can comprise an RF communications antenna 225 driven by an RF communications circuit 220. The RF communications circuit is also in communication with the controller 210 (e.g., via electrical leads and one or more PCBs 205). In an embodiment, the communications unit supports short-range wireless data transfer with ultra-low latency and ultra-low power requirements. Some methods include ultra-wideband (UWB) communication with short pulses rather than carrier frequencies. The antenna 225 can comprise, for example, electric and/or magnetic diploe antennas that can also be optimized for ultra-low latency and ultra-low power data transfer. Example antennas can include, wide-band microstrip, wide-band monopole antenna over a plate, wide-slot UWB antenna, stacked patch UWB antenna, taper slot (TSA) UWB antenna, elliptical printed monopole UWB antenna, metamaterial (MTM) structure UWB antennas, and dielectric resonator antennas (DRAs).

In accordance with one or more embodiments, the electronics provided in the wireless pill 200, particularly the controller 210, can utilize processing-in-memory (PIM) architecture. In PIM, data is computed, analyzed, and turned into information and real-time insights by bringing computation closer to the data, instead of moving the data across to a CPU. This way, the data needed to be transferred from the wireless pill 200 to a remote monitoring computer (not shown) along with the required power for data transmission can be optimized. For instance, not all measurements relating to pH (e.g., capacitance/voltage (C/V) curves) has to be transferred, instead specific information such as the calculated pH measurements, can be transferred and thereby provide the more valuable data points to the monitoring system at the surface. In an embodiment, a location of the sensors while capturing the measurements can be determined in order to build a pH profile of measurements captured at respective locations along the string. For example, as the drilling fluids particles are moving with the fluid at a given pumping rate (GPM), the depth of the sensors while pH measurements are taken can be calculated based on the pump strokes.

The circuit of electrical components within the wireless pill 200 are powered by the energy unit, which comprises one or more batteries 230 connected to the powered components by electrical leads and the one or more PCBs 205. In an embodiment, the power source comprises button batteries, preferably of the type having a high energy density. In an embodiment, the battery can be rechargeable. As shown, in an embodiment, the batteries can be provided at one end of the wireless pill. The wireless pill 200 requires relatively little power to operate as it only contains a communications module, controller, pH sensor, and a power source, making it suitable for downhole use.

Figure 2B:
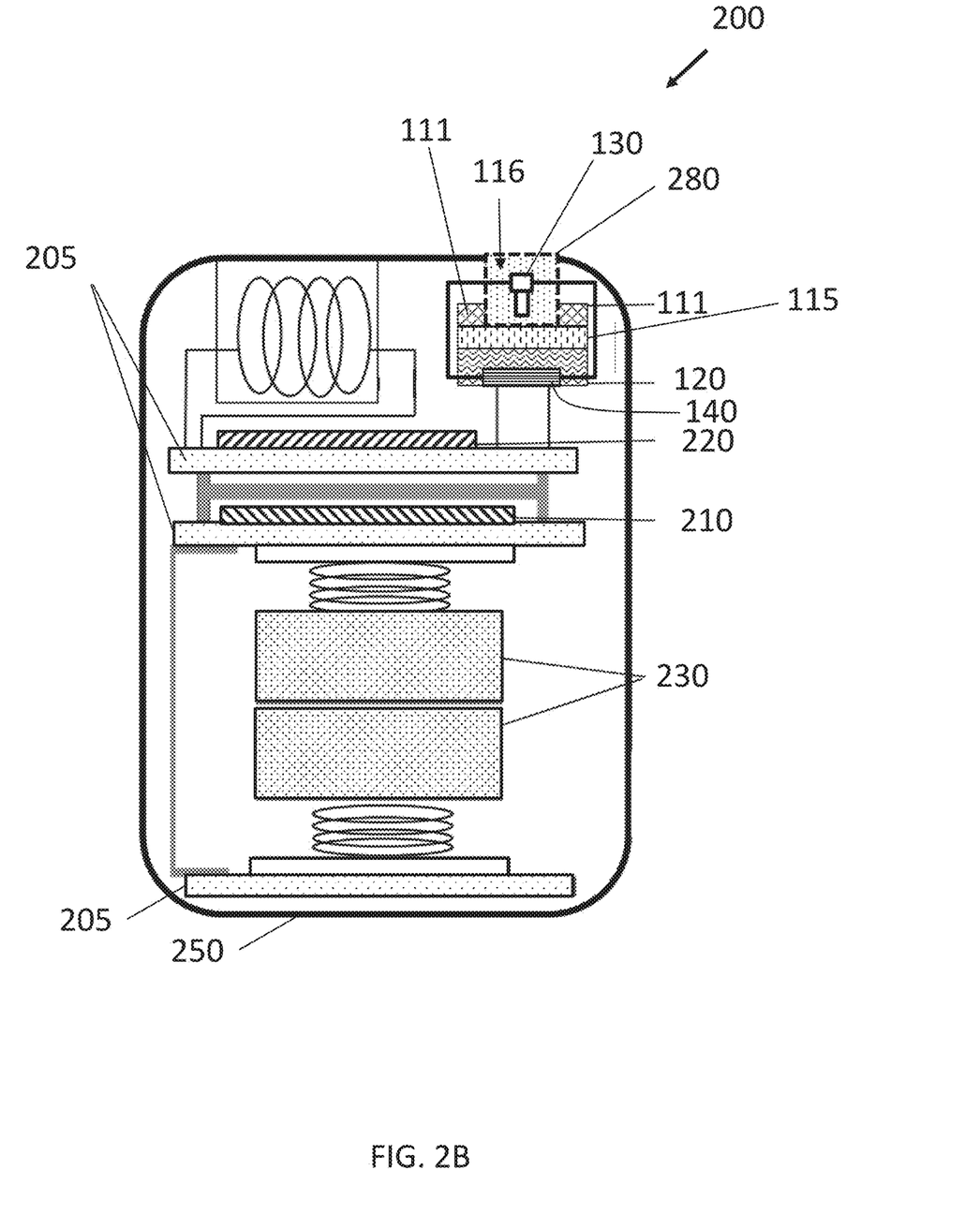
FIG. 2B is a schematic diagram of the wireless pH sensor device of FIG. 2A illustrating an exemplary arrangement of the components of the EIS pH sensor in relation to a pill-shaped outer shell, according to an embodiment.

In an embodiment, the EIS sensor is located at an end of the wireless pill, for instance, at the opposite end of the wireless pill from the batteries as shown in FIG. 2A. FIG. 2B is a diagram of the wireless pill 200 illustrating an exemplary arrangement of the components of the EIS pH sensor 100 in relation to the outer shell 250. As shown, the electrolyte 116 (drilling fluid) is contacting the insulator/sensitive layer via a sampling window 280 that located next to the EIS sensor in the wireless pill. In an embodiment, this window 280 is made of a membrane material.

An effective method to combine different modules in the wireless pill can be to segment and stack the modules (e.g., the PCBs 205 respectively associated with the RF communications circuit 220 and controller 210 in FIG. 2A) and interconnect them with short signal paths known as through-chip vias or through-silicon vias (TSVs). Therefore, no compromise has to be made with respect to material selection, and the same chip area can be used for all the different modules, resulting in seamless interlayer communication for interoperability of diverse components. Such heterogeneous 3D integration results in a significant reduction in the overall size of the wireless pill and consequently its cost can be reduced.

The wireless pill also has a protective shell 250 configured to protect the internal components from the harsh downhole environment while also enabling the measurement of pH using the EIS sensor 100. The shell can comprise one or more chemical coatings such as polymers and/or epoxy, resin-based materials, or any suitable material that can withstand continuous exposure to the harsh downhole environment. In other words, the material composition of the shell is selected to resist degradation under the effect of aggressive chemicals, in combination with high temperatures and pressures that can exist in a downhole drilling environment.

In an embodiment, the pill-shaped shell for encapsulating the electronics is composed of a functional polymer such as "Poly" (vinyl-benzyl chloride-co-2,4,5-trichlorophenyl acrylate, short name VBC-TCPA), which is a polymer type that is sensitive to pH change. In addition or alternatively, other types of polymers that can be used. The pH sensitive polymers can be classified into three categories: those with acidic groups (such as —COOH and —$SO_3H$) such as Polyacids and those with basic groups (—$NH_2$) such as Polybases. In addition, natural polymers can also display pH-responsive behavior. Examples include chitosan, hyaluronic acid, alginic acid and dextran. Materials may swell, collapse, or change depending on the pH of their environment. The pH sensitive polymers used for the shell can be materials that will respond to the changes in the pH of the surrounding medium by varying their dimensions. Therefore, the shell will not prevent connection between the drilling fluid and EIS sensor.

In an embodiment, the size and shape of the shell 250 is preferably close to the size and shape of the electronics package encapsulated therein. In an embodiment, and as shown in FIG. 2, the diameter and length of the wireless pill are 11 mm and 20 mm, respectively. This exemplary design can improve flexibility and reduce the cost of the wireless pill.

Figure 3:
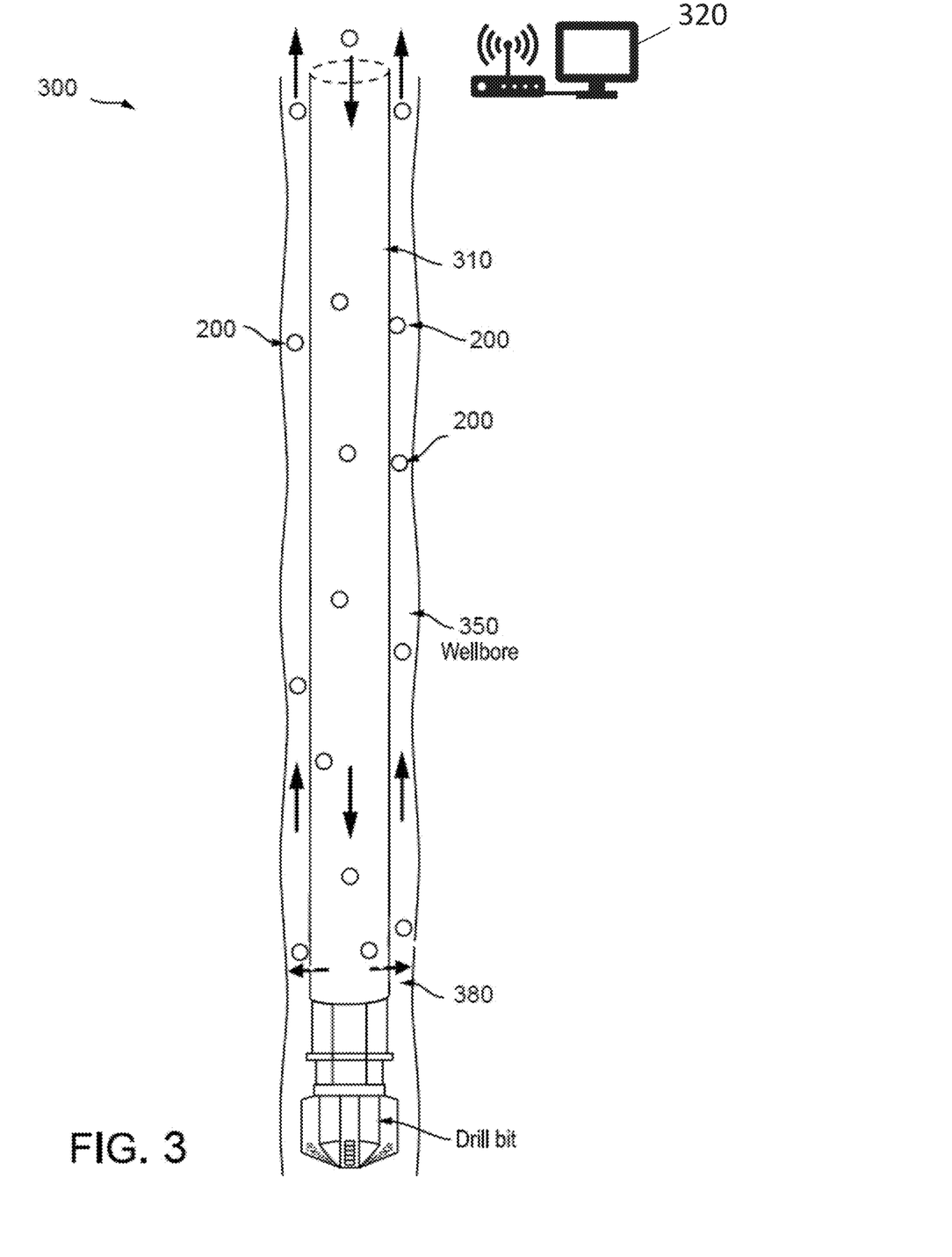
FIG. 3 is a perspective side-view of an exemplary pH monitoring system comprising a plurality of EIS pH sensor devices circulating through a wellbore, according to an embodiment.
Figure 4:
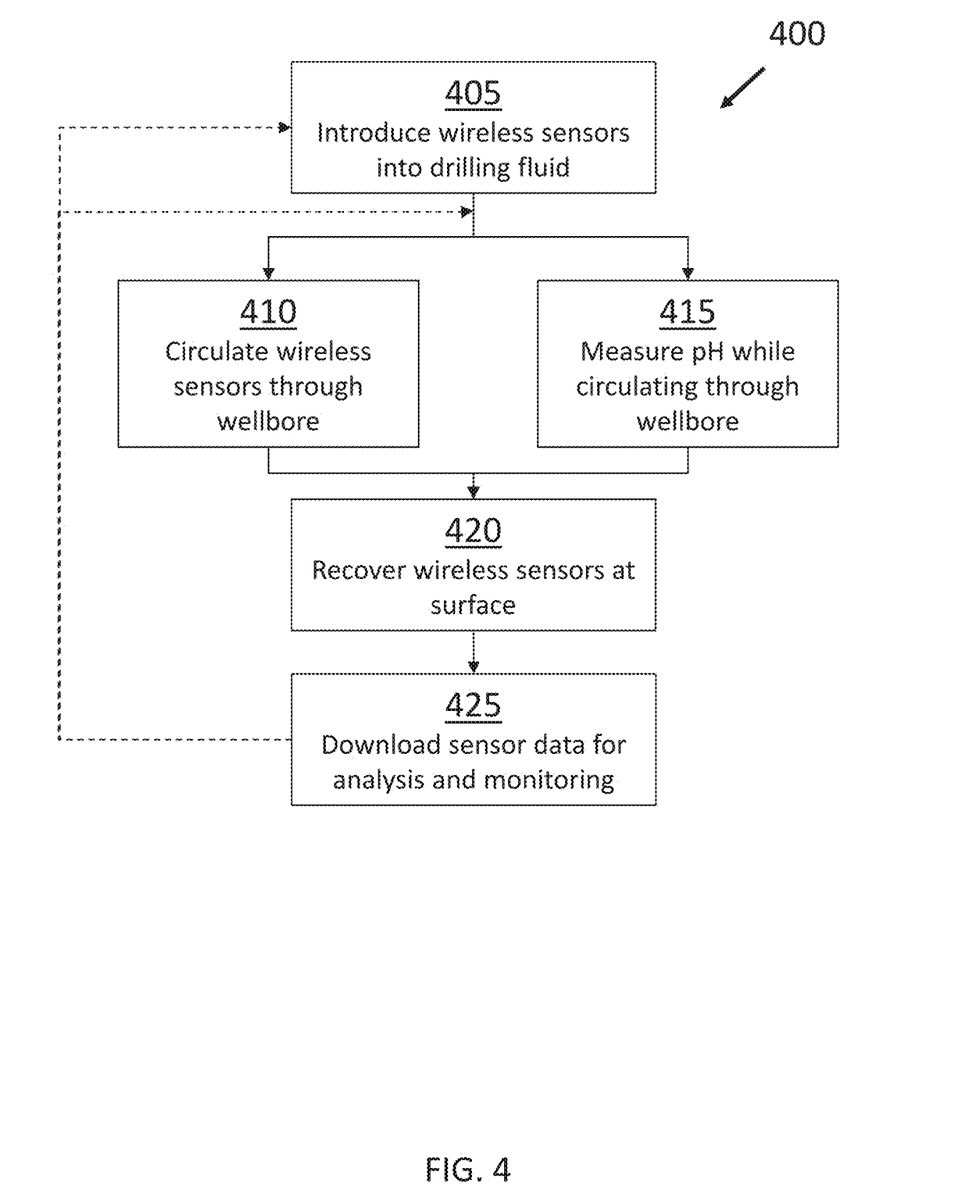
FIG. 4 is a process flow diagram illustrating an exemplary method for monitoring pH of a wellbore using a pH monitoring system, according to an embodiment.

FIG. 3 is a side-view diagram illustrating an exemplary system 300 for real-time measuring and monitoring of drilling fluids pH in a downhole drilling environment. The system comprises a plurality of wireless pills 200 for measuring the pH of the WBM drilling fluid as it is circulated through a wellbore 350 during drilling. FIG. 4 is process flow diagram illustrating an exemplary method 400 for real-time measuring and monitoring of pH in a downhole drilling environment using the system 300 of FIG. 3 and sensor device shown and described in connection with FIGS. 1A-2B.

In an embodiment, the wireless pills 200 are introduced into the drilling fluid at the surface (step 405) and circulated with the drilling fluid by a circulation system (not shown, step 410). Preferably the wireless pills 200 are dispersed within the drilling fluid so as to achieve a sufficiently even distribution of sensor devices through the volume of the wellbore and thereby providing. Circulation can include the wireless pills 200 being first pumped with the WBM internally down through the drill string 310. The WBM and wireless pills 200 are then released from the drill string 310 before the first restriction of the bottom-hole assembly, for instance, via openings (not shown) through the drill pipe provided in the area identified by reference number 380. The flow of the WBM then transports the wireless pills back to the surface through the space between the outer wall of the drill string 310 and the surrounding walls of the wellbore 350. During the circulation cycle the wireless pills 200 are configured to capture pH measurements (step 415). The wireless pills can be configured to capture pH measurements at predefined sampling frequency, which can be a function of a data-resolution required for the given application and system parameters such as memory capacity, power and the like. This system and methodology enables the acquisition of pH data over the complete borehole profile.

In addition, the wireless pills 200 can deliver near real-time measurements of drilling fluid pH to a monitoring computer 320 at the surface. More specifically, the wireless pills can be recovered at the surface (step 420) where the data can be downloaded by wired or wireless means to a monitoring computer 320 for further analysis of the captured information (step 425) and monitoring.

For instance, in an embodiment, the monitoring computer 320 can comprise a communications transceiver connected to one or more antennas, which can be positioned in proximity to the WBM circulation system at the surface and configured to read or otherwise receive data from respective wireless pills 200 as the wireless pills pass by the antenna. In such an embodiment, the wireless pills can circulate through the wellbore for multiple cycles before removal. In addition or alternatively, the wireless pills can be physically removed from the WBM after one or more cycles in order to download the sensor data to the monitoring computer before re-introducing the sensors into the drilling fluid and repeating steps of method 400.

As would be understood, the sensor pills can be in unidirectional or bidirectional communication with the monitoring computer 320 configured to read or receive the measured sensor data from the wireless sensors, analyze and monitor the measured sensor data and related information. Optionally the monitoring system can be configured to transmit information to the sensor devices such as control commands.

Figure 5:
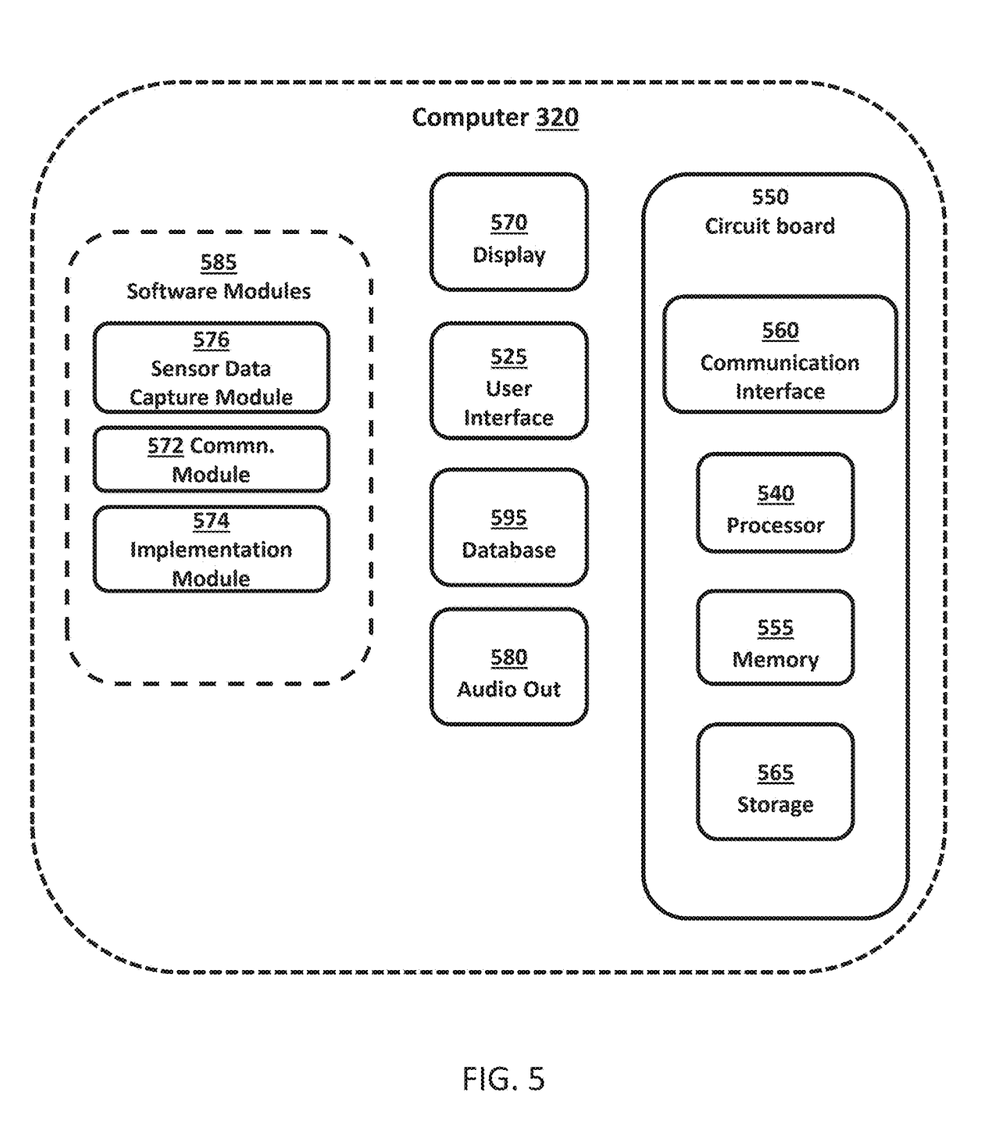
FIG. 5 is a conceptual diagram of an exemplary monitoring computing device for use with the pH sensing system, according to an embodiment.

FIG. 5 is a block diagram illustrating an exemplary configuration of the monitoring computer 320 for processing the sensor information received from the sensor pills 200 according to an embodiment of the present invention. As shown, the computing device can be arranged with various hardware and software components that serve to enable operation of the exemplary pH monitoring system 300 and method 400. It should be understood that other computing and electronics devices used in the embodiments of the disclosure can have similar hardware and software components as shown and described in FIG. 5.

Components of the monitoring computer 320 include a processor 540 that is shown in FIG. 5 as being disposed on a circuit board 550. The circuit board can include a memory 555, a communication interface 560 and a computer readable storage medium 565 that are accessible by the processor 540. The circuit board 550 can also include or be coupled to a power source (not shown) for powering the computing device.

The processor 540 and/or the circuit board 550 can also be coupled to a display 570, for visually outputting information to an operator (user), a user interface 525 for receiving operator inputs, and an audio output 580 for providing audio feedback, as would be understood by those in the art. As an example, the processor could emit a visual signal from the display, for instance, a visualization representing the pH measurements over the complete borehole profile as measured in near-real time using the wireless pills 200 circulated through the wellbore 350. Although the various components are depicted either independent from, or part of the circuit board 550, it can be appreciated that the components can be arranged in various configurations.

The processor 540 serves to execute software instructions that can be loaded into the memory 555. The processor can be implemented using multiple processors, a multi-processor core, or some other type of processor. The memory is accessible by the processor, thereby enabling the processor to receive and execute instructions stored on the memory and/or on the computer readable storage medium 565. Memory can be implemented using, for example, a random access memory (RAM) or any other suitable volatile or non-volatile computer readable storage medium. In addition, memory can be fixed or removable.

The computer readable storage medium 565 can also take various forms, depending on the particular implementation. For example, the computer readable storage medium can contain one or more components or devices such as a hard drive, a flash memory, a rewritable optical disk, a rewritable magnetic tape, or some combination of the above. The computer readable storage medium also can be fixed or removable or remote such as cloud-based data storage systems (remote memory or storage configuration not shown). The computer readable storage medium, for example, can be used to maintain a database 595, which stores information relating to the capture of pH measurement data from respective wireless pills 200 and/or data used or generated while carrying out operations and implementing aspects of the systems and methods disclosed herein.

One or more software modules 585 are encoded in the memory 555 and/or the computer readable storage medium 565. The software modules can comprise one or more software programs or applications having computer program code or a set of instructions executed by the processor 540. Such computer program code or instructions for carrying out operations and implementing aspects of the systems and methods disclosed herein can be written in any combination of one or more programming languages. While the software modules 585 can be stored locally in computer readable storage medium or memory and execute locally in the processor, the processor can interact with remote computing devices and sensor devices (e.g., sensor pills 200) via communication interface 560, and via a local or wide area network to perform calculations, analysis, control, and/or any other operations described herein.

During execution of the software modules 585, the processor 540 is configured to perform the various operations described herein, including without limitation, analyzing sensor data, controlling the sensor devices. In an embodiment, the monitoring computer 320 can also be configured to control various aspects of the drilling operation in view of the measured sensor data, such as, the systems for controlling the circulation and composition of the WBM drilling fluid and/or systems for controlling operation of the drilling device. The software modules 585 can include code for implementing the aforementioned steps and other steps and actions described herein, for example and without limitation: a sensor data capture module 576, which configures the processor to capture and analyze sensor data measured using, inter alia, the sensor pills 200 and related information about the respective sensors such as sensor identification information, operational status, battery power levels, location information, and the like. The software modules can also include a communication module 572, which configures the processor to communicate with remote devices (e.g., the sensor pills 200) over a communication connection such as a communication network or any wired or wireless electronic communication connection. The software modules can also include an implementation module 574, which configures the processor to control one or more implementation tools (not shown). The implementation tools can include, for example, a drilling rig (not shown) or a drilling fluid circulation and composition control equipment (not shown) for controlling the physical properties of the drilling fluid and circulating the drilling fluid through the borehole, as would be understood by those in the art. The implementation tools can be fully or partially automated under control of the computing device 320 as a function of the measured pH within the borehole and/or the results of other drilling monitoring systems used in the art.

The program code of the software modules 585 and one or more of the non-transitory computer readable storage devices (such as the memory 555 and/or the computer readable storage medium 565) can form a computer program product that can be manufactured and/or distributed in accordance with the present disclosure.

It should be understood that various combination, alternatives and modifications of the disclosure could be devised by those skilled in the art. The disclosure is intended to embrace all such alternatives, modifications and variances that fall within the scope of the appended claims.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The communicating device can include a computer or a server. The communicating device can be portable or stationary.

The term "communication link," or "communication connection," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, Wi-Fi, WiMAX, IEEE 802.11, DECT, 0G, 1G, 2G, 3G, 4G or 5G cellular standards, or Bluetooth.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, Wi-Fi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "server," as used in this disclosure, means any combination of software or hardware, including at least one application or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, and by structures and functions or steps which are equivalent to these recitations.

What is claimed is:

1. A system configured to measure pH of a water-based mud (WBM) drilling fluid in real-time in a downhole drilling environment, the system comprising:
   a wireless pH sensing device configured to be deposited in the WBM and measure the pH of the WBM drilling fluid, the wireless pH sensing device including:
      a capsule shell, wherein the capsule shell is composed of a functional polymer that is sensitive to pH change and wherein the functional polymer is vinyl-benzyl chloride-co-2,4,5-trichlorophenyl acrylate (VBC-TCPA),
      a pH sensor of a type having an electrolyte insulator semiconductor field-effect (EIS) structure,
      a controller operatively connected to the pH sensor and configured to measure the pH of the WBM drilling fluid using the EIS pH sensor,
      a radio-frequency (RF) communications unit operatively connected to the controller and configured to wirelessly transmit the measured pH to a remote monitoring computer, and
      an energy unit for powering the controller, the RF communications unit and the pH sensor, and
      wherein the controller, the RF communications unit, the pH sensor and the energy unit are encapsulated within the capsule shell, and wherein the capsule shell is made of a material that resists degradation from chemicals, temperatures and pressures of the downhole drilling environment,
      wherein the EIS pH sensor comprises:
         a semiconductor substrate, wherein the semiconductor substrate comprises Iridium oxide (IrOx),
         a metal oxide insulator layer disposed over a first surface of the semiconductor substrate, wherein an outer surface of the insulator layer is exposed through the capsule shell and thereby is in contact with the WBM drilling fluid during use, and separates the WBM drilling fluid from the semiconductor substrate, a rear-side electrical contact provided at a second surface of the semiconductor substrate that is opposite to the first surface of the semiconductor substrate, and a reference electrode exposed to the WBM drilling fluid through the capsule shell, wherein the controller is configured to apply a gate voltage between the reference electrode and the rear-side electrical contact and an alternating voltage, and measure one or more electrical parameters representing the pH of the WBM drilling fluid, wherein the reference electrode is an ionic conducting ceramic.

2. The system of claim 1, wherein the one or more electrical parameters are selected from the group consisting of: a potential change at an interface between the drilling fluid and the insulator layer, a capacitance, and a capacitance voltage curve, and wherein the controller is configured to calculate the pH as a function of the measured one or more electrical parameters.

3. The system of claim 2, wherein the RF communications unit is configured for short-range wireless data transfer.

4. The system of claim 1, wherein the controller is configured to periodically measure the pH of the WBM drilling fluid during circulation of the wireless pH sensing device with the WBM drilling fluid through the downhole drilling environment, thereby measuring the pH at a plurality of locations within the downhole drilling environment, respectively.

5. The system of claim 1, further comprising a plurality of the wireless pH sensing device.

6. The system of claim 1, further comprising a monitoring computer provided above ground, wherein the monitoring computer is configured to wirelessly receive the respective pH measurements from the wireless pH sensing device.

7. A system configured to measure pH of a water-based mud (WBM) drilling fluid in real-time in a downhole drilling environment, the system comprising:

a plurality of wireless pH sensing devices configured to be dispersed in the WBM drilling fluid and measure the pH of the WBM drilling fluid during circulation of the WBM drilling fluid through the downhole drilling environment, each of the wireless pH sensing devices including:

a capsule shell, wherein the capsule shell is composed of a functional polymer that is sensitive to pH change and wherein the functional polymer is vinyl-benzyl chloride-co-2,4,5-trichlorophenyl acrylate (VBC-TCPA), a pH sensor of a type having an electrolyte insulator semiconductor field-effect (EIS) structure, wherein the EIS pH sensor comprises:

a semiconductor substrate, wherein the semiconductor substrate comprises Iridium oxide (IrOx), a metal oxide insulator layer disposed over a first surface of the semiconductor substrate, wherein an outer surface of the insulator layer is exposed through the capsule shell and thereby is in contact with the WBM drilling fluid during use, and separates the WBM drilling fluid from the semiconductor substrate, a rear-side electrical contact provided at a second surface of the semiconductor substrate that is opposite to the first surface of the semiconductor substrate, and a reference electrode exposed to the WBM drilling fluid through the capsule shell, wherein the reference electrode is an ionic conducting ceramic, a controller operatively connected to the pH sensor, wherein the controller is configured to apply a gate voltage between the reference electrode and the rear-side electrical contact and an alternating voltage, and periodically measure one or more electrical parameters representing the pH of the WBM drilling fluid during circulation of the wireless pH sensing device through the downhole drilling environment, thereby capturing a respective pH measurement at a plurality of locations within the downhole drilling environment, a radio-frequency (RF) communications unit operatively connected to the controller and configured to wirelessly transmit the measured pH to a remote monitoring computer, an energy unit for powering the controller, the RF communications unit and the pH sensor, and wherein the controller, the RF communications unit, the pH sensor and the energy unit are encapsulated within the capsule shell, and wherein the capsule shell is made of a material that resists degradation from chemicals, temperatures and pressures of the downhole drilling environment, and a monitoring computer provided above ground, wherein the monitoring computer is configured to wirelessly receive the pH measurement respectively captured by the plurality of wireless pH sensing devices upon the plurality of wireless pH sensing devices returning above ground.

* * * * *